United States Patent [19]

Sterman et al.

[11] 3,965,066
[45] June 22, 1976

[54] COMBUSTOR-TURBINE NOZZLE INTERCONNECTION

[75] Inventors: Albert P. Sterman; Henry J. Brands; Frederick W. Weissborn, Jr., all of Cincinnati, Ohio

[73] Assignee: General Electric Company, Cincinnati, Ohio

[22] Filed: Mar. 15, 1974

[21] Appl. No.: 451,512

[52] U.S. Cl. .............................. 60/39.32; 60/39.66; 415/115; 415/138
[51] Int. Cl.² ...................... F02C 7/20; F02C 7/12; F02C 7/18
[58] Field of Search ............. 60/39.32, 39.36, 39.66; 415/115, 116, 111, 113, 138

[56] References Cited
UNITED STATES PATENTS

| | | | |
|---|---|---|---|
| 733,065 | 7/1903 | Martin, Jr. | 285/331 |
| 1,543,348 | 6/1925 | Venton | 285/331 |
| 3,286,461 | 11/1966 | Johnson | 60/39.66 X |
| 3,363,416 | 1/1968 | Heybyrne et al. | 60/39.32 X |
| 3,670,497 | 6/1972 | Sheldon | 60/39.32 |
| 3,843,279 | 10/1974 | Crossley et al. | 415/138 X |

*Primary Examiner*—Carlton R. Croyle
*Assistant Examiner*—Thomas I. Ross
*Attorney, Agent, or Firm*—Henry J. Policinski; Derek P. Lawrence

[57] ABSTRACT

A seal for use between an annular combustor and a turbine nozzle, disposed downstream of the combustor, is provided with means for effectively innerconnecting the combustor with a sidewall surrounding the nozzle. The sidewall includes an upstream extending radially projecting flange and the combustor includes an axially projecting downstream extending flange. The seal includes means for frictionally engaging each of these flanges and retaining them in a sealing relationship while permitting axial and radial frictional sliding motion therebetween. In addition, the present invention provides means for passing cooling air from a surrounding plenum through the seal in a cooling fashion to a pocket formed between the combustor-associated flange and a film-promoting lip which comprises a portion of the combustor liner.

17 Claims, 6 Drawing Figures

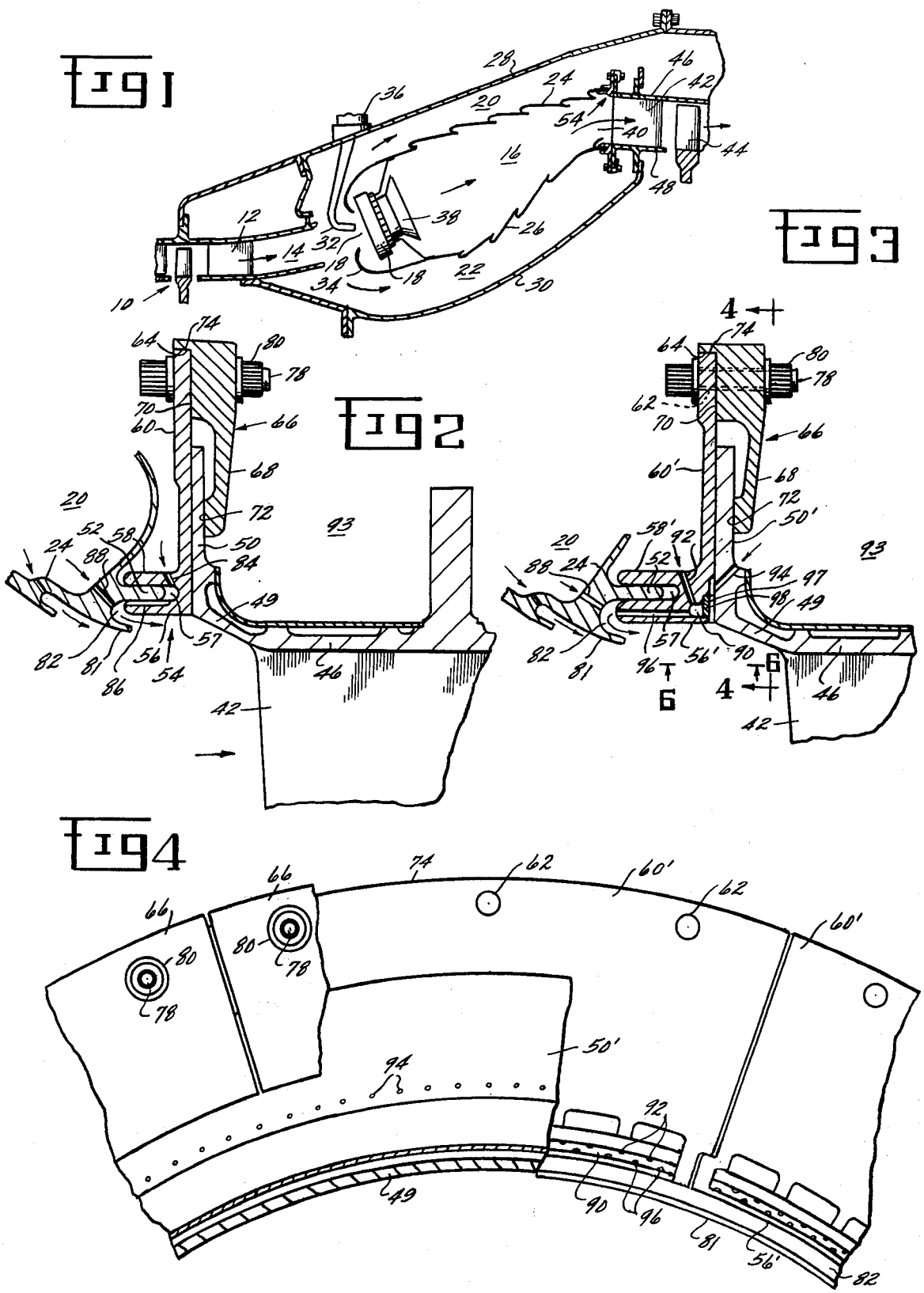

COMBUSTOR-TURBINE NOZZLE INTERCONNECTION

BACKGROUND

The present invention pertains to seals for disposition between combustors and downstream turbine nozzles and more particularly to such seals which permit radial and axial movement between the sealed members as well as providing for cooling of associated members.

In order to enhance the efficiency of operation of gas turbine engines, which include combustors and turbines, it is necessary to provide an effective seal between the outlet of the combustor and the inlet to the turbine so that air from a surrounding cooling plenum cannot leak into the lower pressure area of the hot gas stream. The extreme temperatures associated with these portions of a gas turbine engine require that the seal employed be protected against thermal damage. In addition, the presence of thermal gradients throughout the combustor, turbine and seal materials, create a need for enhancing non-destructive relative spatial dislocation of the elements.

A further significant problem involved is related to vibration of the assembly. Uncontrolled vibration can lead to fatigue failure or at least to cracking of the combustor or turbine members or of the seal itself. Vibrational excitation is prevalent throughout this combination due to the aerodynamic effects of the extremely fast moving gas stream exiting the combustor. Therefore, means for preventing resulting vibration are necessary.

Certain prior art attempts at sealing the junction between the combustor and turbine have created further problems in themselves. For example, one type seal involves a circumscribing generally U-shaped member having one side of the U attached to a combustor liner and the second side attached to the sidewall surrounding the inlet nozzle to the turbine. The attachments utilized are rigid with respect to both sealed elements, and as a result have no means to reduce vibrational excitation or thermal expansion problems. In addition, the U-shaped member opening into the hot gas stream permits hot gases from the stream to reside within the seal for a significant period of time. Such residence can lead to thermal damage of the seal.

The current invention overcomes each of these problems in a simple and efficient fashion.

SUMMARY OF THE INVENTION

It is therefore a primary objective of the present invention to provide a seal for disposition between a combustor and turbine nozzle which prevents vibration and thermal expansion damage while reducing sensitivity to the temperatures of the hot gas stream.

In order to accomplish this as well as further objectives of the present invention which will become apparent hereinafter, a seal is provided by this invention which engages a downstream extending flange of the combustor and an upstream extending flange of the turbine nozzle sidewall and retains each in a frictional relationship. This frictional relationship permits axial as well as radial adjustment of relative positions between the elements and also damps vibration of the system. To reduce sensitivity to heat, the configuration of the seal employed eliminates large openings facing the hot gas stream into which the heated gases might be ingested, and also provides cooling air passages for providing communication between those portions of the seal subjected to the direct combustor heat and a surrounding plenum for the purpose of passing cooling air therethrough.

DESCRIPTION OF THE DRAWINGS

The present invention will become more clearly understood by reference to the appended specification taken with the drawings wherein:

FIG. 1 depicts a simplified cross-sectional view of a combustor and turbine combination illustrating the environment of the current invention;

FIG. 2 depicts one embodiment of the invention;

FIG. 3 depicts a second embodiment of the invention;

FIG. 4 depicts a cross-sectional view of a portion of the current invention taken along line 4—4 of FIG. 3;

DESCRIPTION OF A PREFERRED EMBODIMENT

Figure 5:
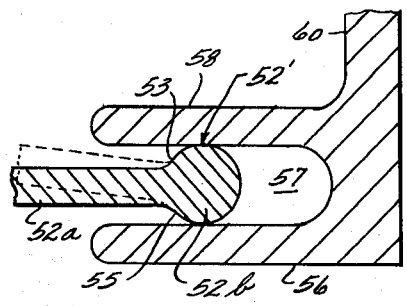
FIG. 5 illustrates a modified portion of the current invention.

Other than with regard to the seal disposed between the combustor and turbine, the illustrations herein pertain to gas turbine engines typical of the aircraft engine variety. In FIG. 1, a compressor stage 10 is depicted which provides a flow of compressed air from a main inlet, now shown, through a plurality of guide vanes 12 and into an inlet 14 upstream of a combustion zone 16. From inlet 14, the compressed air is routed, in predetermined portions, through a combustor dome opening 18 as well as into cooling air plena 20 and 22. The combustion zone 16 is defined between circumferentially extending liners 24 and 26 which also partially define the cooling air plena. Circumscribing the apparatus are a radially outward casing 28 and a radially inward casing 30 which complete the definition of the cooling air plena 20 and 22. A fuel nozzle 32 is disposed within the combustor dome 34 for providing a flow of fuel thereto from a source designated 36. An appropriate mixing device 38 is disposed within the dome 34 and serves to intermix the air entering the dome with the fuel from nozzle 32.

Ignition of this mixture occurs within the combustion zone 16 and the gases produced thereby are of extremely high temperature and rapid expansional characteristics. The shape of the combustor defined by liners 24 and 26 serves to expel the flow of high energy gas axially downstream through a combustor exit 40 and into contact with a turbine nozzle 42 which directs the flow into an efficient angle of attack with respect to a turbine stage 44. Kinetic energy from the flow is transferred to the turbine stage 44 and, by appropriate shaft arrangements (not shown), this energy is transmitted back upstream to drive the compressor stage 10.

Referring now to FIGS. 1 and 2, in order to enhance the efficiency of the flow of hot gas through the nozzle 42, an outer sidewall 46 and an inner sidewall 48 are incorporated into the nozzle structure to define the flow path for the passing gas. It is between sidewall 46 and the combustor liner 24 that the present invention provides a seal. For this purpose, the sidewall 46 includes an upstream extending member 49 having a radially projecting flange 50. The combustor liner 24 includes a downstream extending generally axially aligned flange 52. The flanges 50 and 52 extend circumferentially about the combustor and turbine nozzle, respectively, for a substantial distance. The two are spaced apart by a predetermined distance, and disposed therebetween is the device comprising the current seal.

The seal includes means for engaging and retaining each of the flanges. More particularly, a groove means 54 comprising a portion of the seal includes a pair of axially extending radially spaced walls 56 and 58 which comprise third and fourth flanges and which combine to define a generally annular gap 57 which is dimensioned to receive flange 52 in a frictional tongue and groove relationship. This relationship permits axial sliding of the flange 52 between flanges 56 and 58 to compensate for thermal expansion and contraction of the combustor liner 24 as well as associated members. Furthermore, the tongue and groove cooperation provides an effective seal against leakage of high-pressure cooling air into the hot gas stream.

In this embodiment, the flanges 56 and 58 are formed integrally with one another and also with a radially extending wall 60, generally annular in the cross section. This wall 60 extends about the structure circumferentially and in a segmented fashion such that the individual segments join together to form a circumscribing ring (as described hereinafter with reference to FIG. 4). Wall 60 not only supports the flanges 56 and 58 but also receives flange 50 in an abutting relationship. This relationship provides an effective seal against leakage of hot gas into the junction area between wall 60 and flange 50. In order to maintain this relationship, wall 60 is provided with a plurality of circumferentially spaced apertures 62 and a peripheral shoulder 64. A clamp is provided which comprises a segmented annular ring 66 (having a radial wall portion 68) and axially facing shoulders 70 and 72 for abutting in the direction of wall 60. In addition, a circumferential, radially facing shoulder 74 is adapted to cooperate with the peripheral shoulder 64 of wall 60.

As the seal is assembled, flange 50 is brought into abutment with wall 60. Thereafter, the segmented clamp 66 is brought into overlying and engaging relationship with both wall 60 and flange 50 (through shoulders 70 and 72, respectively). To properly align the clamp, shoulder 74 is brought into abutment with peripheral shoulder 64. In order to maintain this configuration, a plurality of bolts 78 are projected through the apertures 62 (and mating apertures in clamp 66) and held therethrough by means of mating nuts 80. The nuts and bolts are tensioned so as to create a retaining force between shoulder 72 of the clamp and wall 60. This clamping force retains flange 50 therebetween.

While, as mentioned hereinabove, the dimensions of flange 52 and the circumferential groove 57 between flanges 56 and 58 provide a frictional and axially slideable relationship for the retention of combustor flange 52, the tensioning of clamp 66 by the bolts 78 may be set at a predetermined level in order to similarly provide a retaining force and radially slideable relationship of the nozzle flange 50 with respect to the wall 60. The radially and axially slideable nature of the retention of the flanges permits non-destructive adjustment of the relative flange position during structural or thermal stressing of the combination.

In addition, the clamping load placed upon flange 50 may be of such a level as to perform frictional damping of the vibration carried by the assembly by damping relative motion between the sidewall 46 and combustor liner 24.

In the embodiment thus described, the present invention provides sealing means in the form of a clamping means and a tongue and groove means and provides for an interlock between these means. Both the groove means and the clamp means permit frictional sliding motion of their respectively retained flanges. The sliding motion of the flange 52 is permitted to occur in the axial direction while the motion of flange 50 is in the radial direction. As a result, thermal or mechanical forces leading to an adjustment of the positions of the combustor liner 24 and turbine nozzle 42 (or sidewall 46 circumscribing the nozzle), can be absorbed by components of motion in the radial and axial directions. By means of this configuration, the aforementioned objective regarding damping of vibrations and capability for axial and radial position adjustment under stress are accomplished.

FIG. 5 depicts a variation of the present invention which further enhances its flexibility and durability. Under certain operating conditions, the thermal and aerodynamic stresses present in an engine will tend to twist the turbine structure relative to the combustor liner as well as linearly offset the two. Using the embodiment depicted in FIG. 5, this effect can be overcome while further decreasing the likelihood of damage to the seal structure.

More particularly, providing a modified combustor flange 52' with undercuts 53 and 55 results in a flange 52' having a narrow stem portion 52a and a bulbous end portion 52b. The end portion can be formed as a protrusion with rounded edges as shown in the Figure. This configuration enhances the easy rotatability of the liner 26 relative to the sidewall 46 (FIG. 5 illustrates such rotation) by preventing torquing of the flange 52'. This is accomplished by means of the clearance provided by the undercuts 53 and 55 permitting predetermined rotation of flange 52' within gap 57 prior to engagement thereby of flanges 56 and 58.

Turning now to the provision of a cooled seal, which reduces the thermal sensitivity of the overall combination, the embodiments of FIGS. 2 and 3 depict alternative cooling arrangements. Inasmuch as these figures differ only in cooling the foregoing description of the retaining characteristics of the invention apply to both.

Of particular importance to the effective cooling of this seal and its surrounding structure is the passage of sufficient cooling air to prevent the residence of hot gases within portions of the apparatus for too long a period. The cooling system of FIG. 2 involves the plenum 20 identified above as being defined between casing 28 and the combustor liner 24. The plenum is also bounded by flanges 58 and 52 downstream of the liner, the flange 52 being carried by the liner. The liner also includes a circumferentially extending, film promoting lip 81 which projects downstream of the forward portion of flange 52. The lip combines with flange 52 and with flange 56 to define an annular pocket 82. This pocket is utilized as a diffuser to receive cooling air and generate a protective film barrier upon elements immediately downstream thereof in order to protect against direct exposure to the extreme temperatures of the hot gas stream. It is in this area that the apparatus might be particularly susceptible to thermal damage due to the potential for ingesting and retaining quantities of the heated gases. However, according to the present invention, this pocket 82 is disposed upstream of and shielded by protective lip 81 and is shaped with its open end facing downstream and away from the hot gas flow so as to minimize the likelihood of ingestion of heated gases. In addition, the area is cooled with cooling air at sufficient pressure to prevent such ingestion.

For the purpose of passing cooling air, the flange 58 includes a plurality of passages 84 which extend directly between and provide communication between the plenum 20 and the gap 57. A second plurality of generally axial passages 86 extend between and provide communication between the gap 57 and the pocket 82 through the flange 56. Passages 86 may be formed as grooves in the flange 56 which are further defined by cooperation with the flange 52 disposed immediately to the radial exterior thereof. The passages 84 take the form of apertures through the flange 58 in a generally radial direction. The passages 84 and 86 are sized and numbered so as to provide a predetermined air flow from the plenum to the pocket 82. This air flow convectively cools flanges 56, 52 and 58 while passing therethrough and is determined, in part, by the amount of cooling required by the flanges 58, 52 and 56 serially, as well as the quantity of cooling air required to maintain a sufficient pressure within pocket 82 to prevent the ingestion of hot gas from the combustion zone.

To supplement the flow to the pocket 82 for the purpose of preventing hot gas ingestion, as well as for the purpose of providing a cooling air film for the protection of the radially interior side of the surfaces downstream of the pocket, another plurality of passages 88 are provided which extend and provide communication between the pocket 82 and the plenum 20 by penetration through a portion of the liner 24.

In operation, then, the seal means permits a flow of cooling air to pass through the plurality of passages 84 and to be collected within gap 57, cooling flanges 52, 56 and 58 and the gap-defining walls during this process. Subsequently, the cooling air is permitted to escape by way of the plurality of passages 86 into the pocket 82 in order to further cool flange 56 as well as the surfaces of flange 52 to which this air is brought into contact. Having reached the pocket 82, this air joins with air entering the pocket by way of passages 88 and this total quantity is diffused and passed downstream onto the radial interior surface of flange 56 as a protective boundary layer of cooling air film.

In addition to the provision for cooling air, the present invention enables the effective seal of the configuration of FIG. 2 to be made and maintained without requiring an enlarged opening disposed externally of the gas stream into which the heated gas might be ingested and thus potentially damage the structure. Such openings have been required in the past in applications utilizing attachment means other than the inventive attachment means of the present seal.

In an alternative embodiment (that depicted in FIGS. 3, 4 and 6) the seal structure is substantially similar, with the exception of the cooling configuration. In this embodiment, the members 56', 58', 60' and 50' are modified versions of similar elements of the foregoing embodiment. In this embodiment, cooling air is not directed through the gap 57. However, cooling air is directed through the passage 88 in liner 24. Also a manifold groove 90 is defined in the wall 60' to the side thereof abutting flange 50' of the sidewall 46. The groove 90 extends circumferentially of the combustor within the wall 60'.

Figure 6:
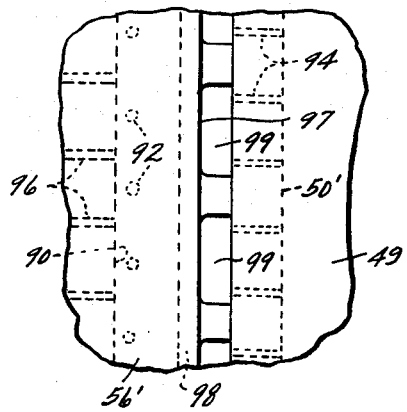
FIG. 6 is a cross-sectional view taken along line 6—6 of FIG. 3.

FIG. 4 shows an axial depiction of a cutaway view of the embodiment of FIG. 3 taken along line 4—4 and progressively cutaway to expose various portions of the device. FIG. 6 depicts a section view of the embodiment of FIG. 3 taken along line 6—6. Most of the apparatus in FIGS. 4 and 6 is similarly applicable to FIG. 2, except for the variation of cooling pattern.

Regarding the cooling pattern, FIGS. 3, 4 and 6 disclose that, in this embodiment, the manifold groove 90 introduced above serves to collect cooling air from several passages and to deliver it to the pocket 82 independently of gap 57. For this purpose the flange 58' includes a circumferentially spaced plurality of generally radially extending passages 92 extending directly between and providing communication between the groove 90 and the plenum 20. These passages are spaced and numbered to carry a predetermined quantity of air flow from the plenum to the groove to cool flanges 56' and 58' and provide a film for pocket 82 as in the earlier embodiment.

In order to protect and cool the sidewalls at the leading edge of the nozzle vanes 42, the present invention additionally provides a second plurality of circumferentially spaced passages 94 which extend between and provide communication between a second circumferential manifold groove 97 and a plenum 93 defined downstream of the clamp 66 and circumscribing sidewall 46. It will be noted that for the purpose of effectively separating the air in groove 90 from the air in groove 97 there is provided a continuous annular ring 98.

Ring 98 is needed because efficient machining requirements dictate that grooves 90 and 97 be formed in one operation and thus open into one another. The ring, then divides the original machined single groove into two separated grooves. Thus the two cooling air flows are controlled independently. A plurality of spaced openings 99 facing radially inwardly upstream of sidewall 46 (see FIG. 6) direct the cooling air from groove 97 onto the upstream leading edge surfaces of the sidewall 46.

In operation, this embodiment functions similarly to that presented in the foregoing embodiment with the cooling air passing through passages 92 and 94 serving to cool associated surrounding members; and, upon reaching manifold grooves 90 and 97 and being exhausted through passages 96 and 99, respectively, the air also cools flange 56' and sidewall 46 by means of the films formed thereupon. In addition, a portion of the air provides a pressure level within the pocket 82 to prevent the ingestion and retention therein of hot gases which could result in thermal damage to the structure.

With regard to the operation of the sealing members of the current invention, the rapidly expanding heated gases within the combustion chamber 16 impact upon the liner 24, the flange 56 (or 56' in the second embodiment) and the sidewall 46 with localized large pressure differentials existing across the boundaries defined by these elements. There is a tendency for the hot gas to leak across the structure radially outwardly and invade the plena 20 and 93 as there is a tendency for cool air to leak into the gas stream. Such leakage across the junction between the liner 24 (and its flange 52) and the associated flanges 56 and 58 of wall 60 is prevented by the frictional tongue and groove engagement between these flanges. Furthermore, the maintaining of a predetermined flow of cooling air through passages 86 serves to prevent ingestion of hot gases within pocket 82 and also the leakage of hot gases across the junction by way of the passages 86.

To prevent leakage of the cool air or hot gas between the abutting walls 50 and 60, the tension upon the bolts 78 is set at a predetermined level and the force is transmitted across walls 50 and 60 by means of clamp 66 and flexure particularly of the portion 68 thereof. As discussed above, the potential still exists for axial and radial relative motion between liner 26 and sidewall 46 in order to provide for adjustment necessary because of thermal or mechanical stresses within the joined structure. Nevertheless, the gases are prevented from leaking between these elements.

The present invention thus provides a simple and effective seal between a combustor liner and associated turbine nozzle and sidewall means which effectively prevents leakage of cool gas into or of hot gas out of a predetermined flow path. The invention permits axial as well as radial and rotary relative adjusting motion between the liner and turbine structure in a non-destructive fashion. Furthermore, the invention provides for cooling in the area of the seal and associated portions of the structure where such cooling is necessary to protect the structure against the heat of the gases within the combustion chamber.

While the present invention has been discussed with regard to two particular embodiments, it is clear that substantial modifications of these embodiments may occur without departing from the concepts of the current invention. For example, further modification of the cooling system will be obvious to those skilled in the art based upon the discussion of this specification. Additionally, while the seal is shown to include a tongue and groove cooperation as well as a clamp cooperation, the two might be interchanged, or either might be utilized in both positions. So long as the conceptual characteristics of the invention are present, a departure has not taken place.

What is claimed as new and desired to be secured by Letters Patent of the United States is:

1. A seal for use between an annular combustor and a turbine nozzle disposed downstream of the combustor, the nozzle including a circumscribing sidewall, wherein the seal comprises:
   an upstream-extending first flange associated with the nozzle;
   a downstream-extending second flange associated with the combustor;
   clamping means for frictionally clamping and engaging said first flange, said clamping means including first and second spaced and opposed walls, each of said walls abutting and frictionally engaging said first flange, and further including tensioning means for applying a clamping load between said first and second walls said clamping load effective to hold each of said first and second walls in said abutting and frictional engagement with said first flange;
   and said clamping means having a portion projecting from one of said walls for frictionally retaining and engaging said second flange.

2. The seal of claim 1 wherein said clamping means permit relative sliding motion between said first and second flanges, respectively.

3. The seal of claim 2 wherein one of said flanges is movable in the radial direction and the other is movable in the axial direction.

4. The seal of claim 3 wherein said clamping means permit relative rotational motion between said first and second flanges.

5. The seal of claim 2 wherein said portion comprises groove means for cooperating with said second flange in a slideable tongue-and-groove relationship.

6. The seal of claim 5 wherein said first flange projects generally radially outwardly with respect to said nozzle, and said second flange projects generally axially of said combustor.

7. The seal of claim 5 wherein said first and second walls extend generally radially from and circumferentially about said combustor for a predetermined distance.

8. The seal of claim 7 wherein said first and second walls are circumferentially segmented, and said tensioning means comprises a bolt.

9. The seal of claim 5 wherein said second flange includes an enlarged, generally rounded protrusion frictionally rotatable within said groove means.

10. The seal of claim 5 wherein said combustor includes a liner partially defining a cooling air plenum, said liner carries said second flange, and wherein
   said groove means includes opposed third and fourth flange means spaced apart by a predetermined gap to receive said second flange therebetween.

11. The seal of claim 10 wherein said third flange means further defines said plenum and includes first cooling air passage means providing communication between said plenum and said gap for cooling said gap.

12. The seal of claim 11 wherein said liner includes a circumferentially extending, film-promoting lip proximate said second flange, said lip partially defining an annular pocket circumscribing said fourth flange; and wherein said fourth flange further includes second cooling air passage means for providing communication between said pocket and said plenum.

13. The seal of claim 12 wherein said second passage means include a passage extending from said gap to said pocket and said first passage means includes a passage extending from said gap to said plenum.

14. The seal of claim 12 wherein said liner further comprises third cooling air passage means providing communication between said pocket and said plenum, said third passage means including a passage extending directly from said plenum to said pocket.

15. The seal of claim 10 wherein said third flange means further defines said plenum, said liner includes a circumferentially extending film-promoting lip proximate said second flange, said lip partially defines an annular pocket circumscribing said fourth flange, and said third flange means further includes fourth cooling air passage means for providing communication between said pocket and said plenum, wherein said fourth passage means includes a circumferentially extending manifold groove, a passage between the manifold groove and the plenum, and a passage between the manifold groove and the pocket.

16. The seal of claim 15 further comprising:
   a second circumferentially extending manifold groove;
   fifth cooling air passage means providing communication between said plenum and said second manifold groove; and
   opening means disposed upstream of said circumscribing sidewall for directing a flow of cooling air onto said sidewall.

17. The seal of claim 16 wherein said first and second manifold grooves are separated from one another by a continuous annular ring.

* * * * *